US010438143B2

(12) United States Patent
Vemula et al.

(10) Patent No.: US 10,438,143 B2
(45) Date of Patent: Oct. 8, 2019

(54) COLLABORATIVE DECISION ENGINE FOR QUALITY FUNCTION DEPLOYMENT

(71) Applicant: Bank of America Corporation, Charlotte, NC (US)

(72) Inventors: Srikanth Vemula, Hyderabad (IN); Sunil Reddy Gaddam, Ranga Reddy (IN); Sasidhar Purushothaman, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 1027 days.

(21) Appl. No.: 14/867,244

(22) Filed: Sep. 28, 2015

(65) Prior Publication Data

US 2017/0091633 A1     Mar. 30, 2017

(51) Int. Cl.
*G06Q 10/06*     (2012.01)

(52) U.S. Cl.
CPC .................................. *G06Q 10/06* (2013.01)

(58) Field of Classification Search
CPC .. G06Q 10/06; G06Q 30/02; G06Q 10/06395; G06Q 10/04; G06Q 30/0203; G06Q 10/06315; G06Q 10/06375; G06Q 10/10; G06Q 40/08; G06Q 50/22; G06Q 10/0635; G06Q 10/0637; G06Q 10/0639; G06Q 30/0201; G06Q 10/063118; G06Q 10/0633; G06Q 10/06393; G06Q 30/018; G06Q 30/0205; G06Q 30/0282; G06Q 30/0631; G06Q 40/00; G06Q 40/06; G06Q 50/12; G06Q 50/184; G06F 17/50; G06F 17/18; G06F 19/00; G06F 19/324; G06F 19/326; G06F 3/011
See application file for complete search history.

(56) References Cited

U.S. PATENT DOCUMENTS

| | | | |
|---|---|---|---|
| 5,278,751 A * | 1/1994 | Adiano | ................. G06Q 10/06 705/7.32 |
| 5,732,200 A | 3/1998 | Becker et al. | |
| 5,765,137 A | 6/1998 | Lee | |
| 6,301,516 B1 | 10/2001 | Ostrowski et al. | |
| 6,353,767 B1 | 3/2002 | Wakeman et al. | |
| 6,405,344 B1 | 6/2002 | Ali et al. | |

(Continued)

OTHER PUBLICATIONS

Cameron, A. C., & Windmeijer, F. A. (1997). An R-squared measure of goodness of fit for some common nonlinear regression models. Journal of econometrics, 77(2), 329-342. (Year: 1997).*

(Continued)

*Primary Examiner* — Alexey Shmatov
*Assistant Examiner* — Oluwatosin O Alabi
(74) *Attorney, Agent, or Firm* — Michael A. Springs; Moore & Van Allen PLLC; Peter B. Stewart

(57) ABSTRACT

Disclosed is systems, methods, and computer program products that provide for a technique for reducing computing resources, storage space needs, and network bandwidth associated with collaborative decision making. More particularly, this disclosure relates to a system for performing automatic predictive decision making using predictive fit models derived from previous user responses and the user characteristics of each responding user, and using the results to reduce the amount of computing and operational resources needed to operate a collaborative decision engine.

15 Claims, 6 Drawing Sheets

(56) References Cited

U.S. PATENT DOCUMENTS

| | | | |
|---|---|---|---|
| 6,535,775 B1 * | 3/2003 | Bagepalli | G06F 17/50 700/109 |
| 6,741,951 B2 | 5/2004 | Whaling et al. | |
| 6,757,660 B2 | 6/2004 | Canada et al. | |
| 6,771,294 B1 | 8/2004 | Pulli et al. | |
| 6,937,913 B2 | 8/2005 | Nishikawa et al. | |
| 6,993,495 B2 | 1/2006 | Smith, Jr. et al. | |
| 7,398,223 B2 | 7/2008 | Kahlert et al. | |
| 8,019,554 B2 | 9/2011 | Conway et al. | |
| 8,121,886 B2 | 2/2012 | Azar | |
| 8,121,889 B2 | 2/2012 | Casco-Arias et al. | |
| 8,473,528 B2 | 6/2013 | Lamm, Sr. | |
| 8,548,842 B1 | 10/2013 | Race | |
| 8,996,437 B2 * | 3/2015 | Brillhart | G06Q 30/0203 706/46 |
| 2002/0059093 A1 | 5/2002 | Barton et al. | |
| 2002/0077882 A1 | 6/2002 | Nishikawa et al. | |
| 2002/0107948 A1 | 8/2002 | Ali et al. | |
| 2003/0125997 A1 | 7/2003 | Stoltz | |
| 2003/0149499 A1 | 8/2003 | Kirshenbaum | |
| 2003/0163349 A1 | 8/2003 | Ho | |
| 2004/0083019 A1 | 4/2004 | Suzuki et al. | |
| 2004/0117051 A1 | 6/2004 | Ford | |
| 2004/0162752 A1 | 8/2004 | Dean et al. | |
| 2004/0181446 A1 | 9/2004 | Vance | |
| 2006/0136276 A1 * | 6/2006 | Schmitt | G06F 17/50 705/7.41 |
| 2006/0224325 A1 | 10/2006 | Conway et al. | |
| 2006/0224441 A1 | 10/2006 | Kerkar et al. | |
| 2006/0282306 A1 * | 12/2006 | Thissen-Roe | G06Q 10/06 705/7.14 |
| 2009/0018891 A1 * | 1/2009 | Eder | G06Q 10/06 705/7.28 |
| 2009/0157453 A1 | 6/2009 | Araki et al. | |
| 2012/0004925 A1 * | 1/2012 | Braverman | G06F 19/325 705/2 |
| 2015/0032424 A1 * | 1/2015 | Gupta | G01C 21/00 703/2 |

OTHER PUBLICATIONS

Fayyad, U., Piatetsky-Shapiro, G., & Smyth, P. (1996). The KDD process for extracting useful knowledge from volumes of data. Communications of the ACM, 39(11), 27-34. (Year: 1996).*

Hauser, John R., and Don Clausing. "The House of Quality." Harvard Business Review (1988). (Year: 1988).*

Wu, H. H., Liao, A. Y. H., & Wang, P. C. (2005). Using grey theory in quality function deployment to analyse dynamic customer requirements. The International Journal of Advanced Manufacturing Technology, 25(11-12), 1241-1247. (Year: 2005).*

Miyoung Jeong, Haemoon Oh, Quality function deployment: An extended framework for service quality and customer satisfaction in the hospitality industry, International Journal of Hospitality Management, vol. 17, Issue 4, Dec. 1998, pp. 375-390.

Hoerl, Roger W. "Six Sigma black belts: what do they need to know'?." Journal of Quality Technology 33.4 (2001): 391-406.

Taeho Park, Kwang-Jae Kim, "Determination of an optimal set of design requirements using house of quality", Journal of Operations Management, vol. 16, Issue 5, Oct. 1998, pp. 569-581.

Irem Dikmen, M. Talat Birgonul, Semiha Kiziltas, "Strategic use of quality function deployment (QFD) in the construction industry, Building and Environment", vol. 40, Issue 2, Feb. 2005, pp. 245-255, ISSN 0360-1323.

Yi Qing Yang, Shou Qing Wang, Mohammad Dulaimi, Sui Pheng Low, "A fuzzy quality function deployment system for buildable design decision-makings, Automation in Construction", vol. 12, Issue 4, Jul. 2003, pp. 381-393, ISSN 0926-5805.

Zhai, Lian-Yin, Li-Pheng Khoo, and Zhao-Wei Zhong. "A rough set enhanced fuzzy approach to quality function deployment." The International Journal of Advanced Manufacturing Technology 37.5-6 (2008): 613-624.

Kumar, Ashok, Jiju Antony, and Tej S. Dhakar. "Integrating quality function deployment and benchmarking to achieve greater profitability."

Vijay R. Kannan, Keah Choon Tan, "Just in time, total quality management, and supply chain management: understanding their linkages and impact on business performance", Omega, vol. 33, Issue 2, Apr. 2005, pp. 153-162, ISSN 0305-0483.

Matzler, Kurt and Hans H. Hinterhuber, "How to make product development projects more successful by integrating Kano's model of customer satisfaction into quality function deployment". Technovation, 18:1 (1998). pp. 25-38.

J. R. Hausing et al, "The House of Quality," Harvard Business Review, May-Jun. 1988, No. 3, pp. 63-73.

Tuvet-Lan Tran et al., Quality Function Deployment (QFD): An Effective Technique for Requirements Acquisition and Reuse, Proc. 2nd IEEE Intl Software Eng. Stand. Symp. (ISESS '95), pp. 191-200, IEEE, 1995.

* cited by examiner

COLLABORATIVE DECISION ENGINE FOR QUALITY FUNCTION DEPLOYMENT

FIELD OF THE INVENTION

This disclosure generally relates to collaborative decision making based on a quality function deployment method.

BACKGROUND

Complex decision making processes regarding an application feature usually involves consideration of multiple criteria by many users, each user having unique opinions and vantage points. One technique for assessing the extent to which an application feature is successful is to ask the opinions of a community of users that use the feature. The responses can then be quantified and weighted based on respondent feedback, respondent backgrounds, and inputs from a manager of the feature. Finally, the quantified and weighted responses can be aggregated and processed through a collaborative decision engine to provide an overall picture of how the feature is perceived by the community of users. This collaborative approach to decision making allows the manager of the feature to better assess the feature's usefulness, efficiency, importance, and other qualities of the feature.

The collaborative decision engine approach is data intensive because it involves quantifying and weighting every response for each user in the community and then aggregating the quantified and weighted responses for every aspect of the feature. As the number of users in the community grows and as the number aspects of the feature that are evaluated by each user increases, the computational resources required by the collaborative decision engine to handle the workload increases drastically. Additionally, it is difficult and time consuming to have every individual user in the community of users of a feature to respond to surveys related to a feature every time a feature is assessed.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for reducing computing resources associated with collaborative decision-making using a self-learning predictive fit model system.

Complex decision making processes usually involve consideration of multiple criteria including cost, quality, scope, effectiveness, ease of use, and the like. It is important to properly structure a problem for decision making purposes and explicitly evaluate the multiple criteria, considering the relative significance of each criteria factor and the significance of each responding user's input. There is a need for systematic identification via a tool for the evaluation of various parameters involved in order to make the decisions. In some embodiments, these complex decision-making problems are being made in regard to features of an application owned or managed by an entity. These applications may be any virtual or physical process, business group, software, guidelines, organizational structure, or other process or internal organization related in some way to the entity. The system may be designed such that the decision making process may identify a possible solution, choice, or resolution to a problem associated with the application. Each application comprises one or more "features," or application components, that may be analyzed independently to provide some decision response for the associated application. Examples of questions or problem statements for features that may be solved using the complex decision making process include whether a feature's service models should be shared or discreet, whether one or more individuals are suited to a role in the application, which database model should be used in an application, whether an application should use cloud or local data storage, decisioning on service levels, decisioning on the criticality of service levels, decisioning on location preference for an application, decisioning on which team of individuals should be associated with an application, and decisioning on whether to operate in virtual or physical environments. These examples are not meant to be all-encompassing limitations to the invention, but are provided as some examples of the many types of problems that the decision making process may address. The system may be configured to analyze "criteria" of these features to better understand how users of the features perceive, support, or use the application features.

One embodiment of the present invention generally refers to a system that receives user responses to surveys regarding criteria of an application feature, associates the user input along with user characteristics of each responding user in a relational database, and using a pattern analyzer to create predictive fit models for each criteria that may be used in future decision-making processes, reducing or eliminating need for issuing and analyzing more surveys.

Embodiments of the invention comprise a system, computer program product, and method for reducing computing resources associated with collaborative decision-making, said system comprising one or more memory devices having computer readable program code stored thereon and one or more processing devices operatively coupled to the one or more memory devices. The one or more processing devices are configured to execute the computer readable program code to identify a plurality of users that use a feature, wherein the feature is at least a portion of an application. The system may also retrieve, from a database, sets of user characteristics for each of the plurality of users. Additionally, the system may identify criteria associated with the feature, wherein the criteria are aspects of how the plurality of users perceive the feature. Furthermore, the system may determine predictive responses for each criteria of the feature based on stored prediction fit models for each criteria and each set of user characteristics represented in the identified plurality of users.

In some embodiments, the system may determine confidence scores for each predictive response based on the predictive response, the stored fit models for each criteria, and the sets of user characteristics. Next, the system may determine that a first predictive response from the predictive responses for each criteria does not meet a threshold confidence score and then provide a survey to the plurality of users comprising at least one question related to the predictive response that does not meet the threshold confidence score. Furthermore, the system may receive an actual response as user input from the plurality of users, replace the first predictive response with the actual response, and display the actual response, along with the predictive responses that do meet their respective threshold probability of accuracy.

In some embodiments of the system, the one or more processing devices are further configured to execute the computer readable program code to identify a plurality of features, identify a plurality of users that user one or more of the features, and receive, from a database, a set of user characteristics for each of the plurality of users. Furthermore, the system may provide feature surveys to users for each of the plurality of features, wherein the surveys request user input for criteria associated with each feature, receive the user input for the criteria of each feature, and receive user weighting of each criteria for each feature. Additionally, the system may apply the user weighting to each criteria.

In some embodiments, the system further determines user group weighting for each user input for a criteria based on a user group associated with each user. Next, the system may associate and store the user input, the user weighting, the user group weighting, and the set of user characteristics for each user in a relational database. Furthermore, the system may determine a criteria response distribution for each user characteristic by analyzing the relational database. Finally, the system may create a fit model for each criteria response distribution, wherein the fit model provides a predictive analysis of how a future user would respond to a criteria question based on a user characteristic.

In some embodiments of the system, the set of user characteristics are characteristics of each responding user and include at least one of user group, age, gender, geographical location, time zone, work experience, education, and technical background. Additionally, in some embodiments of the system, the criteria associated with each feature include at least one of ease of use, intuitiveness, speed, maintainability, effectiveness, amount of support required, usefulness, whether the feature should be retained, and the extent to which a responding user utilizes the feature.

In some embodiments of the system, the one or more processing devices are configured to execute the computer readable program code to display the confidence scores to an application manager.

In some embodiments of the system, providing a survey to the plurality of users further comprises not providing a survey to at least one user based at least on a very low user group weighting value associated with the user group associated with the at least one user.

In some embodiments of the system, the criteria response distribution for each user characteristic is analyzed by a pattern analyzer that determines a linear or nonlinear regression fit model for the response distribution.

BRIEF DESCRIPTION OF THE DRAWINGS

Figure 1:
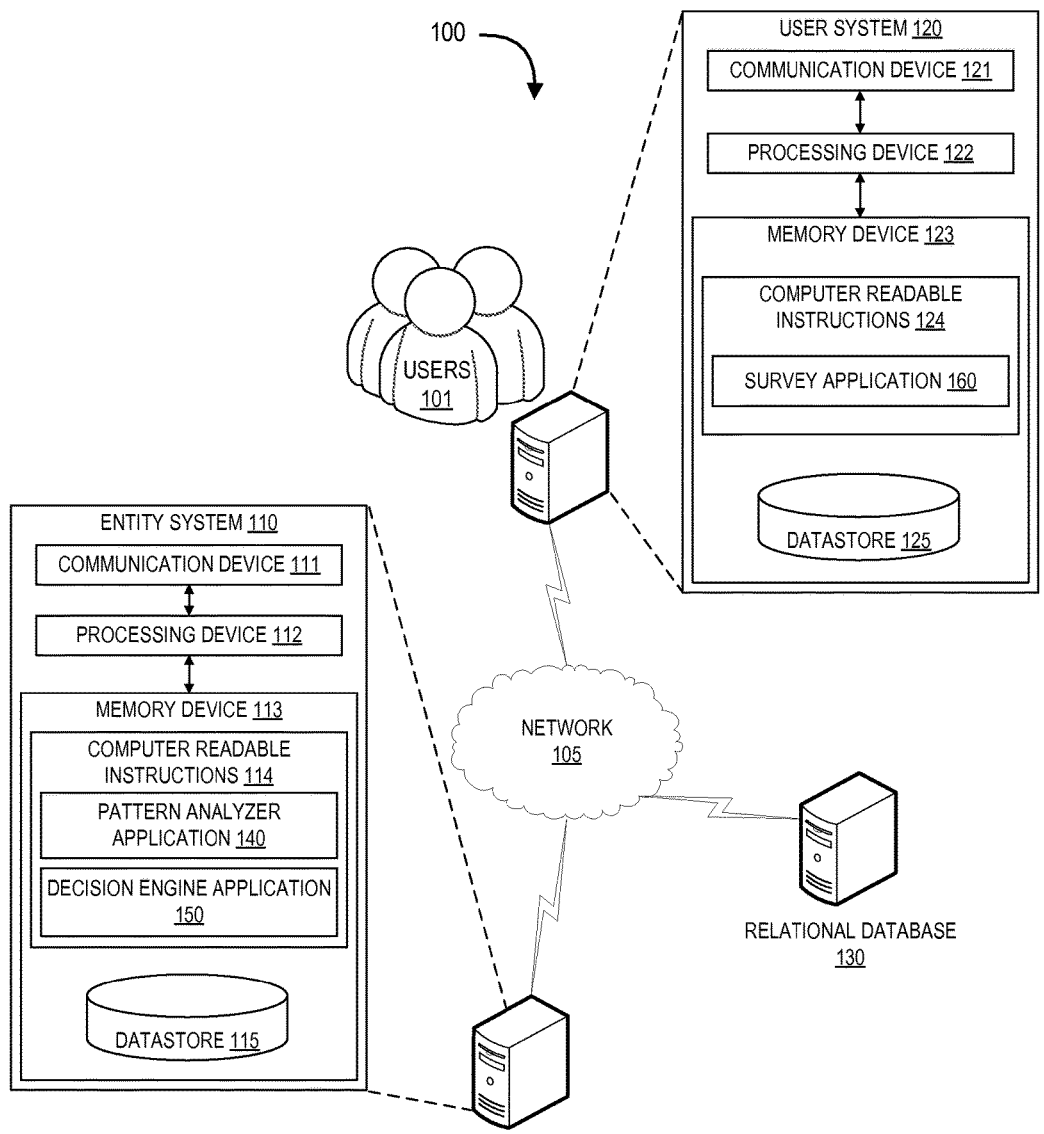
Figure 2:
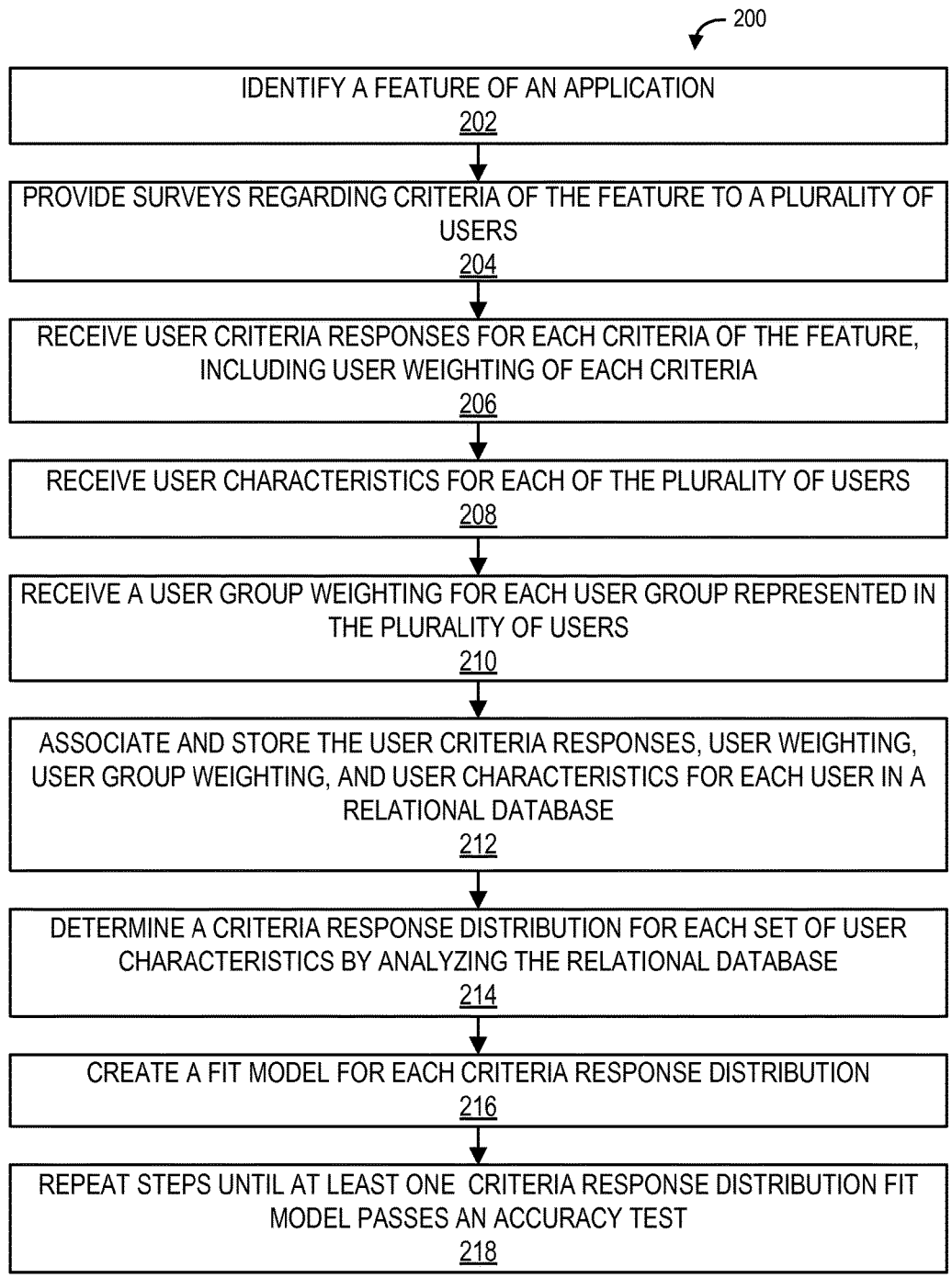
Figure 3:
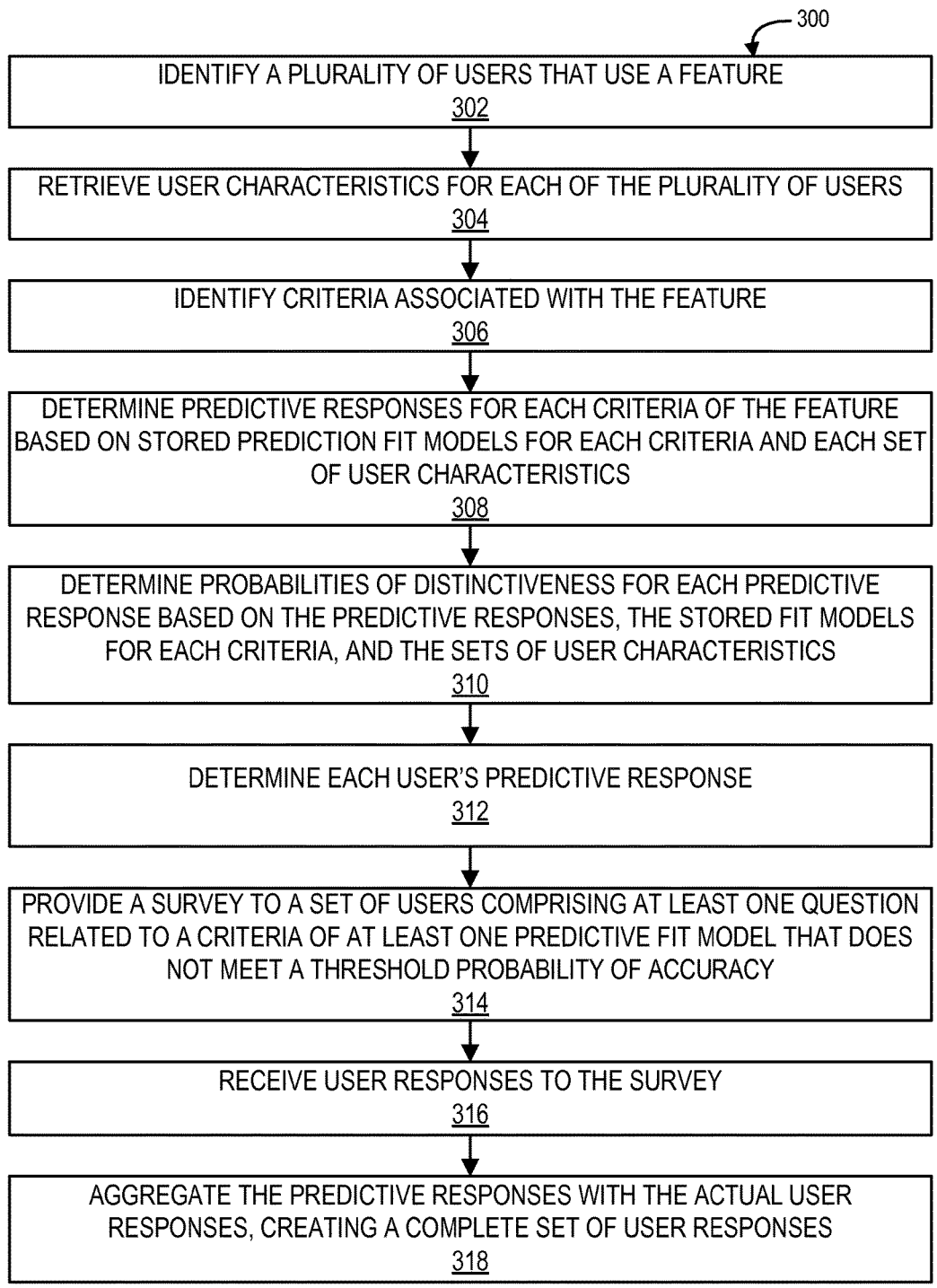
Figure 4:
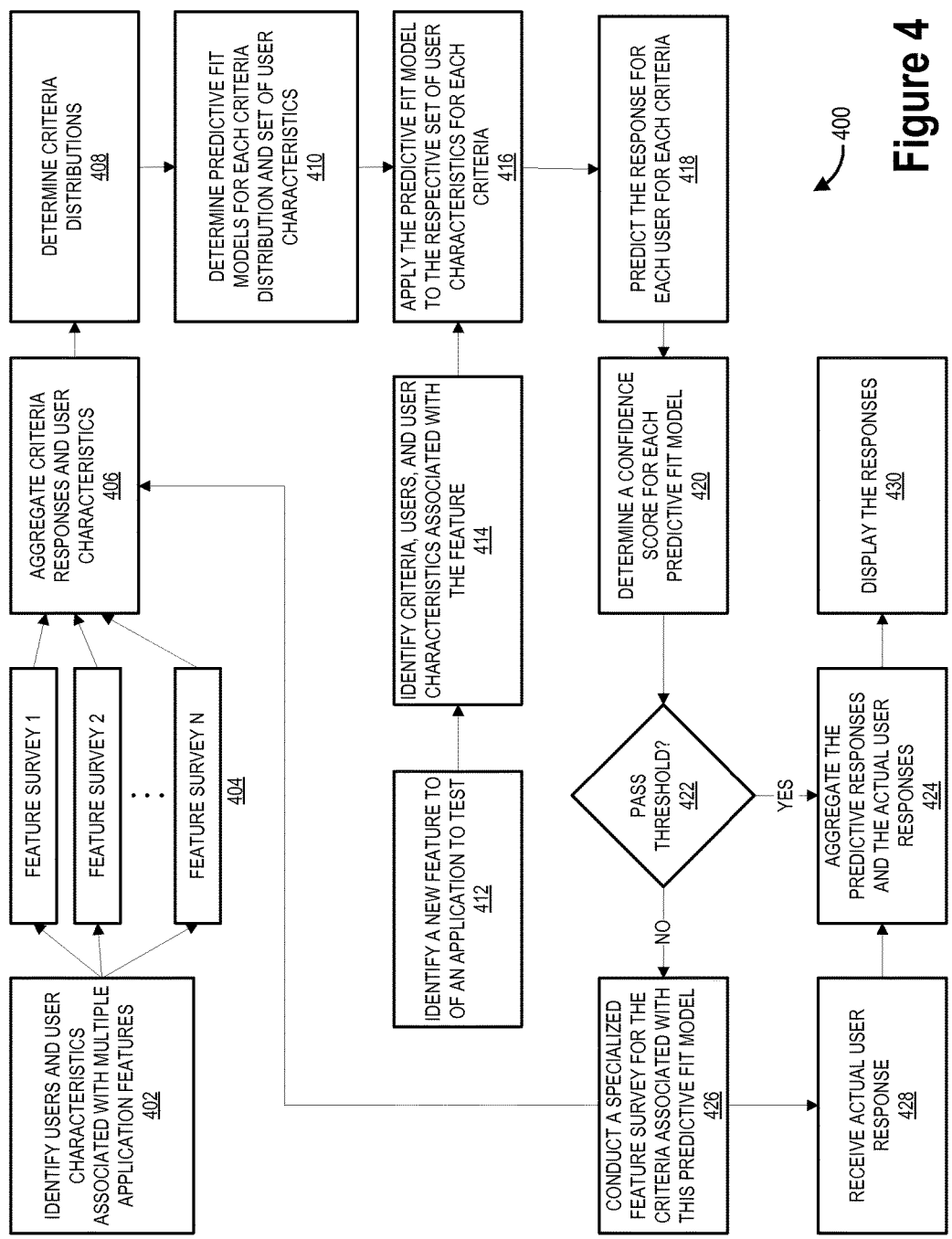
Figure 5:
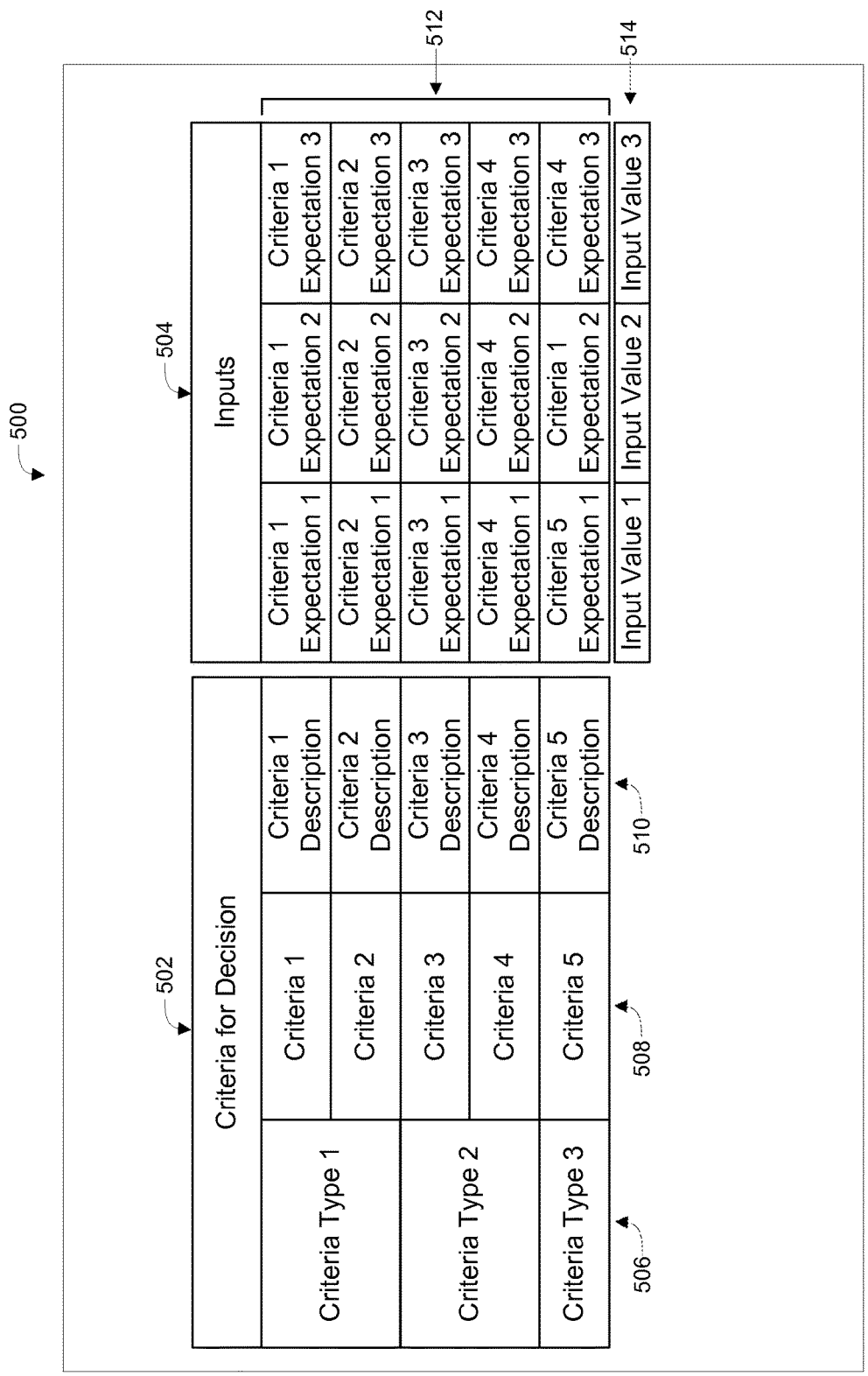
Figure 6:
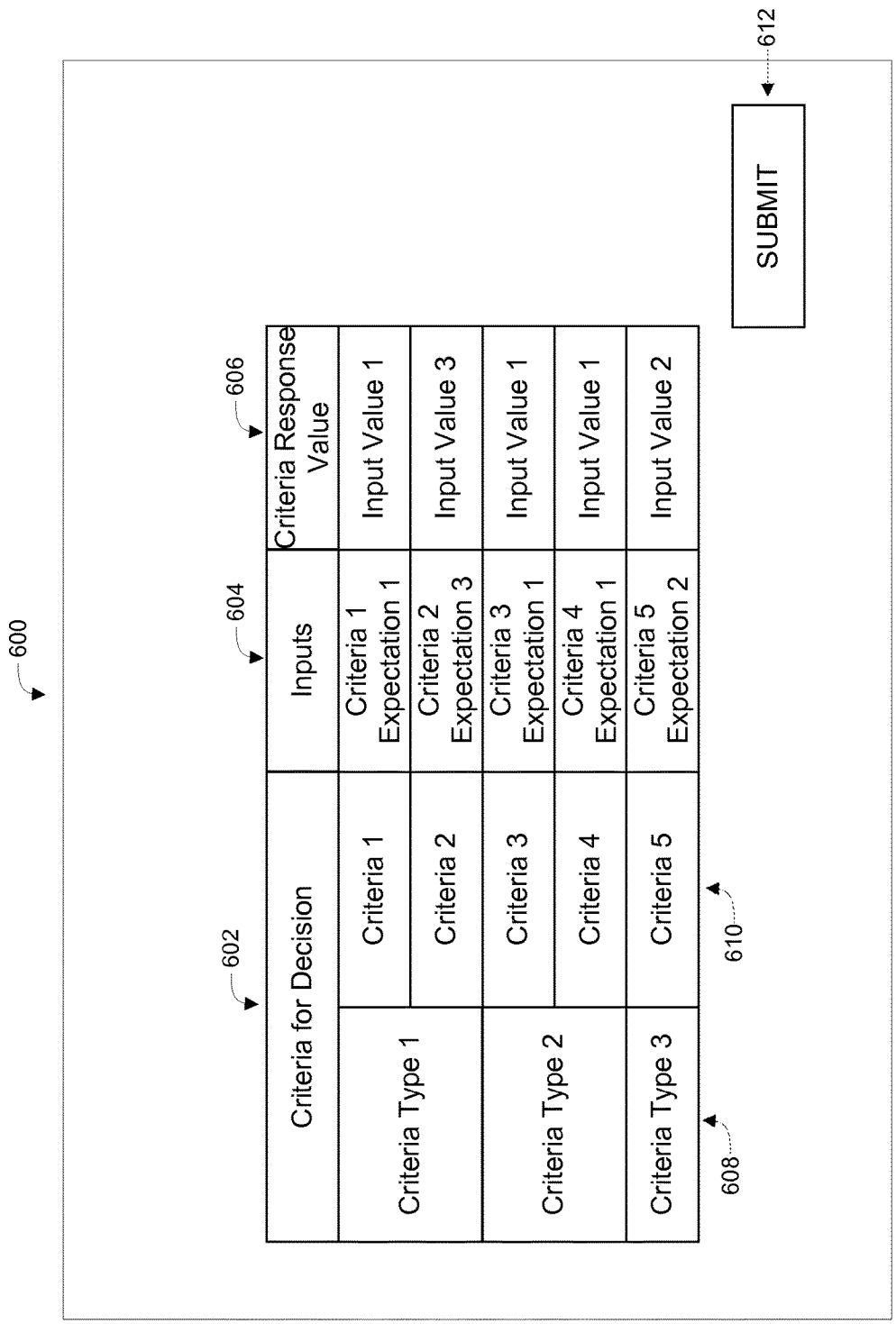

Having thus described embodiments of the invention in general terms, reference will now be made to the accompanying drawings, which are not necessarily drawn to scale, and wherein:

FIG. 1 is a block diagram of a system environment, in accordance with an embodiment of the invention;

FIG. 2 is a general process flow for completing collaborative decision making with user surveys and creating predictive fit models for the criteria response distributions, in accordance with an embodiment of the invention;

FIG. 3 is a general process flow for conducting predictive analysis of a hypothetical criteria survey before an actual survey is provided to users, in accordance with embodiments of the present invention;

FIG. 4 is a general process flow for reducing computing resources associated with collaborative decision-making using a self-learning predictive fit model system, in accordance with an embodiment of the invention;

FIG. 5 is a sample user interface display for a survey application, in accordance with an embodiment of the invention; and FIG. 6 is a sample user interface display for a survey application, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

The system generally comprises a requirements or decisioning criteria collection subsystem that accepts input from a large number of participants (or "users") through survey items. The requirements subsystem is akin to a modified Quality Function Deployment (QFD). The system further comprises a data patternizer which examines survey item responses by users and user characteristics, over time, to predict survey responses for groups of participants with certain user characteristics. The data patternizer reduces the computing resources, storage space needs, and network bandwidth required to capture survey item responses by limiting the administering of survey items to only those sets of users with highly variable or unpredictable responses which greatly reduces the total number of surveys required by the decision engine.

Various embodiments or features will be presented in terms of systems that may include a number of devices, components, modules, and the like. It is to be understood and appreciated that the various systems may include additional devices, components, modules, and the like, and/or may not include all of the devices, components, modules, and the like, discussed in connection with the figures. A combination of these approaches may also be used.

Embodiments of the invention are directed to a system, method, or computer program product for a distributive network system with specialized user interface connections for the communication of surveys and user responses, specific triggering events associated with the presentment of the surveys, and data transformation of user responses to allow for an entity to quantitatively analyze the criteria of an application feature. Additionally, the system, method, or computer program products conduct continuous monitoring of relational databases associated with the network to identify changes in the stored data in real-time to maintain a high level of accuracy.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems, methods, and computer program products are described herein that provide for a technique for reducing computing resources associated with collaborative decision-making. More particularly, this disclosure relates to a system for performing automatic predictive decision making based on historical information, and using the results to reduce the amount of computing resources needed to operate a collaborative decision engine.

The concepts discussed herein are generally directed to collaborative decision making, which includes testing a feature of an application by asking users of the feature questions about specific criteria related to the feature. As used herein, an "application" may be any business process, software application, or other unit that is provided by an entity and used by a set of users. Likewise, a "feature" may be any component, module, piece, segment or other element of an application that is distinguishable from other aspects of the application. In some circumstances, a feature may be the entire application.

The entity may test a feature of an application by providing surveys to the users of the feature, and assessing the responses to the surveys. As discussed in more detail herein, the entity may aggregate multiple surveys and use the characteristics of the users that answered the surveys to predict how users will respond to future feature surveys. By predicting the results of at least some surveys for a given application feature, the entity can reduce the overall number of surveys sent out to users and significantly reduce the computational requirements of assessing actual surveys from the plurality of users. The predictive analysis aspect of the invention can increase in accuracy as more surveys are conducted, and therefore can be considered a "learning" and evolving aspect.

An "entity," as used herein, refers to any profit or non-profit organization. Profit organizations refer to companies that produce and/or provide goods and/or services, or companies that sell, offer for sale, distribute, trade, and/or otherwise deal in goods and/or services (hereinafter "products"). Profit organizations include, by way of example, phone companies, search engine companies, financial institutes, investing firms or investing firms or investment banks, mortgage companies, financial consulting firms, and the like. Non-profit organizations may be defined as groups structured for other purposes than generating profits, but may also provide the same or similar types of goods and/or services as the for profit institutions. Examples of non-profit organizations include, but are not limited to, government sponsored sectors, and government funded institutes, projects, services, and so on.

Referring to FIG. 1, a block diagram of a system environment 100 is provided for executing the process flows 200 and 300, described respectively in FIGS. 2 and 3. The system environment 100 includes an entity system 110, a user system 120 associated with multiple users 101, and a relational database 130, communicating with one another through a network 105. An "entity system" is typically owned or administrated by an entity and may include personal computers, mainframe computers, any suitable informatics systems, or a hybrid thereof. A "system environment" may be any information technology platform of an enterprise (e.g., a national or multi-national corporation), and may include a multitude of servers, machines, mainframes, personal computers, network devices, front and back end systems, database systems and/or the like.

In the embodiments shown in FIG. 1, the entity system 110 includes a communication device 111, at least one processing device 112, and at least one memory device 113, in communication with the processing device 112. The memory device 113 contains computer readable instructions 114 including a pattern analyzer application 140 and a decision engine application. Additionally, the memory device 113 includes a datastore 115 for storing pattern analyzer data, decision engine data, and other related information. In some embodiments, the entity system 110 is managed by the entity and located at a facility associated with the entity or remotely from a facility associated with the entity.

The user system 120 includes a communication device 121, a processing device 122, and at least one memory device 123, in communication with the processing device 122. The memory device 123 contains computer readable instructions 124 including a survey application 160. Additionally, the memory device 123 includes a datastore 125 for storing user characteristics data, survey application information, and other related information. The user system 120 can be personal computers, electronic notebooks, desktops, mobile device, or any computing device having network capability and in communication with the entity system 110 and the relational database 130 through the network 105. In some embodiments, the computing devices of the user system 120 may be a specialized computing device that performs specific functions of the invention as described herein.

The user system 120 is referred to as a single system, but it should be understood that the user system 120 is really a system that is associated with a plurality of users that may interact with the user system 120. As such, the user system 120 may comprise multiple computing devices, each associated with its own user 101, or a group of users 101.

In some cases, a user interface is provided by the entity and can be installed on the user system 120, as part of a user-side application, which, as shown in FIG. 1, is the survey application 160, also provided by the entity. Of course, as there are multiple users 101 associated with the system 100, any reference to a user interface includes the possibility that there are multiple user interfaces that may each interact with a single user or a group of users. The user interface can be launched by running the survey application 160 that talks with the entity system 110. In some embodiments, the user interface is part of a server-side survey application, built on the entity system, and can be presented to the user through a web browser by invoking the server-side application. A user-side application generally means that the application is stored and executed on a user's computer; while a server-side application means that the application runs on a server's computer, which, in the present incident, is the entity system 110 that talks to the user system 120 through the network 105.

The relational database 130 may be any data storage device that is capable of storing data in a relational model of tables, rows, and the like. The data stored in the relational database 130 may be accessed, stored, and maintained by relational database management systems (RDBMS). As such, the entity system 110 and the user system 120 may comprise RDBMS that are configured to access, store, and maintain relational data in the relational database 130.

As used herein, the processing devices 112, 122 includes circuitry for executing the functions of the entity system 110 and the user system 120. For example, each of the processing devices 112, 122 can include a digital signal processor device, a microprocessor device, and various analog-to-digital converters, digital-to-analog converters, and other support circuits. Control and signal processing functions of the entity system 110 and the user system 120, in which the processing devices 112, 122 reside, may be allocated between these devices according to their respective capabilities. The processing devices 112, 122 also include functionality to operate one or more software programs based on computer-executable program code portions thereof, which may be stored, along with the computer readable instructions 114, 124, in the memory devices 113, 123 on the entity system 110 and the user system 120.

The memory devices 113, 123, as described herein, store the computer readable instructions 114, 124 and the datastores 115, 125. In some embodiments, the memory devices 113, 123 may include volatile memory, such as RAM having a cache area for the temporary storage of information. The memory devices 113, 123 may also include non-volatile memory that may be embedded and/or removable. The non-volatile memory may additionally or alternatively include an Electrically Erasable Programmable Read-Only Memory (EEPROM), flash memory, and/or the like. The memory devices 113, 123 can store any information and data that are used and administrated by the entity system 110 and the user system 120 to implement the functions thereof.

In some embodiments, the survey application 160 of the user system 120 may provide questions to the users 101 related to a feature being analyzed through the collaborative decision engine application 150. The survey application 160 may then receive input from the users 101 and convey the user input to the relational database 130, the pattern analyzer application 140, and/or the decision engine application 150. The functions and capabilities of the survey application 160 are described in more detail below, especially in FIGS. 2, 5, and 6.

In some embodiments, the pattern analyzer application 140 of the entity system 110 is configured to access data from the survey application 160 and/or the relational database 130, and can determine data distributions and an appropriate data fit model for such data. The functions and capabilities of the pattern analyzer application 140 are described in more detail below in FIG. 2.

In some embodiments, the decision engine application 150 of the entity system 110 is configured to access data from the survey application 160, the relational database 130, and/or the pattern analyzer application 140, and can aggregate the data, conduct predictive analysis on information, and determine accuracy scores of the predictive analyses. The functions and capabilities of the decision engine application 150 are described in more detail below in FIG. 3.

The entity system 110, the user system 120, and the relational database 130, are each operatively connected to the network 105 and communicate with one another there through. The network 105 can include various networking interfaces, such as a local area network (LAN), a wide area network (WAN), a global area network (GAN), such as Internet, or a hybrid thereof. The network 105 may be secure or unsecure and may also include wireless and/or wireline and/or optical interconnection technology.

Turning now to FIG. 2, a general process flow 200 is provided for completing collaborative decision making with user surveys and creating fit models for the criteria response distribution based on user characteristics. The process 200 includes the block 202 of identifying a feature of an application. This identified feature is a feature that will be assessed by the users of the application to provide feedback to a manager of the application. As used herein, the term "manager of the application" may be any individual, group, or team that is responsible for the use and/or functionality of the feature or the application. In some embodiments, the manager of the application is associated with the entity. The feature may be identified be receiving an indication from the manager of the application that a specific feature should be analyzed. In other embodiments, the system may have a list of applications and their respective features, such that the system may sequentially or randomly select each feature, one at a time, to be assessed automatically.

The process 200 further includes block 204 of providing surveys regarding criteria of the feature to a plurality of users. As used herein, the term "users" generally refers to the community of individuals that utilize the application, or at least the feature associated with the application. These users are selected to provide surveys to because these users are knowledgeable of the real-world aspects of the features and likely have valuable input. In some embodiments, the users are associated with the entity in some manner, and therefor may be easily identified by the entity system through records. For example, the users may be employees, contractors, or customers of the entity, so the entity can easily identify all business groups, customer classes, and the like that interacted with the feature at some point in time.

As used herein, the term "criteria" refers to characteristics of a feature that may be analyzed by users of the feature. The users may be asked questions about the criteria of a feature to gather each user's opinions and perceptions of the criteria to better understand how a user would make a decision regarding the feature. Examples of criteria for the feature include cost, quality, scope, ease of use, intuitiveness, speed, maintainability, effectiveness, amount of support required, usefulness, coverage needs, work load, criticality, staffing, skill required to operate, whether the feature should be retained or removed, the applicability of the feature to a user, and the like. This list is meant to be a non-exhaustive representation of the types of criteria that may be used in the system and many other criteria may be used.

In some embodiments, the surveys provided to the users include all possible criteria of the application. For example, the system may have a list of all possible criteria (as input by the manager of the application) that may apply to features of every application associated with the entity, and this list is used in the survey. In such embodiments, the survey may allow users to respond that certain criteria do not apply to the current feature being assessed. In other embodiments, the surveys provided to the users include only the criteria that pertain to the feature at hand, as determined by the manager of the application associated with the feature. As such, only the most relevant criteria would be assessed in each survey, and the criteria used in the surveys may vary between different features and/or applications.

The surveys may be provided to the users in a number of ways including, but not limited to, physical mail delivery, electronic mail delivery, physical paper delivery, or electronically through a user device associated with each user. In some embodiments, a survey is provided in response to a determination that a new application or a new feature of an application has been added to the system environment. In some embodiments, the surveys are provided to the users via a secure network. In embodiments where the survey is provided through a user device associated with each user, the system may send an email, text message, link to a webpage, or other communication to the user, prompting the user to answer the questions presented in the survey regarding each criteria of the feature. As such, the user device may comprise a graphical user interface that displays the survey questions to the users and allows the user to select criteria responses with an input mechanism of the user device. In some embodiments, the surveys are presented at least substantially in the form represented in FIGS. 5 and 6. Generally, the surveys display several criteria for the feature, provide definitions for the criteria and/or instructions to the users on how to evaluate the criteria, provide multiple selectable criteria responses for each criteria that the user may select, and allow for user weighting of each criteria and/or criteria input response.

The selectable criteria responses for each criteria in the surveys are the possible expectations, options, opinions, or other feedback for each criteria. For a very general example, there may be three selectable inputs for each criteria, the first selectable input being of high importance, the second selectable input being a medium expectation, and the third selectable input being a low expectation.

The process 200 then moves to block 206, where the system receives user criteria responses for each criteria of the feature, including user weighting of each criteria. In some embodiments, the user responses are received via the user devices associated with the plurality of users. The received user criteria responses include at least the user selection for each criteria expectation in the survey. In some embodiments, the user criteria response includes user-provided weightings for each of the criteria expectations. Some embodiments of the user criteria responses and weightings are discussed more fully in FIGS. 5 and 6.

Next, the process 200 continues to block 208, where the system receives user characteristics for each of the plurality of users. As used herein, the term "user characteristics" generally refers to biographical information related to an individual user. Examples of "user characteristics" include the user group, such as a business group associated with the entity, a customer group associated with the entity, and/or the like that the user is associated with as part of its interaction with the entity, age, sex, geographical location of residence or employment, work experience, education or other background information, technical knowledge, information technology (IT) knowledge, and the like. This list is meant to be a non-exhaustive representation of the types of user characteristics that may be used in the system and many other criteria may be used. The user characteristics may be retrieved from a database via the network. In some embodiments, the users are employees, contractors, customers, or other associated parties related to the entity, and therefore the entity may have this information stored on employee, contractor, customer, or other databases owned by or accessible to the entity. In some embodiments, some or all of the user characteristics are provided to the system by the users. For example, the system may query the users to provide their user characteristics.

The process 200 then continues to block 210, where the system receives a user group weighting for each user group represented in the plurality of users. As used herein, a "user group weighting" is a quantitative weighting of a user's response to a criteria based on the user group that the user is associated with. As mentioned before, a user group can be a business department, business group, customer group, third party group, or other group of users that are associated with one another based on their connection to the entity and/or the feature. The user group weighting may be designated by a manager of the application and/or the feature, and may be based on how relevant a user group's feedback is on the criteria responses. As such, the system may prompt the manager for a user group weighting for each user group identified in the plurality of users that access the feature. For example, the system may determine that a first user group is associated with at least one user in the plurality of users that use the feature. The system may prompt the manager of the feature to provide a weighting value for this first user group, which may then be applied to at least some of the each user's criteria responses from the surveys. In other embodiments, the system may access a database prepopulated with user group weightings for each feature, application, or type of feature or application. In such embodiments, the system may access a database to retrieve the associated user group weighting for an identified user group, and apply this weighting to the criteria responses of the users in that identified user group. By weighting the user groups that make up the plurality of users that use the feature, the system may give more credence to the more important, influential, or relevant user groups over user groups that are less important, influential or relevant to the operation of the feature.

While the described process 200 describes utilizing the user group associated with a user to weight a user's responses, it should be noted that any user characteristic may be used to weight the responses of a user. For example, a manager may determine that a user's geographical region should require the user's responses to be weighted a certain amount, relative to responses from users in other geographical areas. As such, the use of a user group weighting herein may be replaced by, or used in addition to user response weighting based on other user characteristics.

The process 200 may then move to block 212, where the system associates and stores the user criteria responses, user weighting, user group weighting, and user characteristics for each user in a relational database. For clarity's sake, the term "criteria responses" shall mean the criteria expectations of each user, with or without the user and/or user group weighting of the criteria expectations. The system may store the user criteria responses for each of the plurality of users with the responses of each respective user. In some embodiments, the system may store each user's response to each criteria with the user characteristics of that user in a relational database. In such embodiments, each user's criteria response and user characteristics may be easily associated for later analysis.

By associating and storing each user's criteria responses with their respective user characteristics, the system can compile a large relational database that may easily be accessed by the system to associate user criteria responses and user characteristics for each user. In some embodiments, the system provides multiple surveys to several pluralities of users, each survey comprising criteria questions for one or more features. In such embodiments, the system can compile the user criteria responses and the user characteristics for users from each survey with the user criteria responses and the user characteristics for users from each other survey, thereby compiling what can become a very large relational database of user criteria responses that are associated with the user characteristics of each user that provided a response.

The process 200 further includes block 214, where the system determines a criteria response distribution for each set of user characteristics by analyzing the relational database. The system may access the compiled relational database referenced in block 212 to analyze the relational data held therein. In one embodiment, for each criteria of the feature, the system analyzes the criteria responses and the user characteristics of each user, using multivariate exploratory techniques, to identify patterns and other relationships between the user characteristic makeup of a user and the criteria response associated with that user. For example, the system may determine that for a first criteria, users within a first age range, located in a first geographical area, and from a first user group are more likely to provide a first criteria response than a second or third criteria response. This relationship may be stored as a multi-dimensional distribution of user characteristics relative to criteria responses for the first characteristic. The system may then analyze a second criteria and determine that users from a second geographical region are more likely to select a third criteria response than a first or second criteria response. This relationship will also be stored as a two-dimensional distribution of criteria response relative to geographical region. As more surveys are completed, and therefore more relational data is gathered regarding the first and second criteria, the system can become more accurate in providing a representative distribution of user characteristic relationships and the respective expected criteria responses. Of course, the system will store all user criteria responses relative to user characteristics or the responding users as multi-dimensional distributions so that a predictability engine can continue to analyze the data patterns associated with each multi-dimensional distribution as the surveys are collected and stored in the relational database. As such, the criteria response distributions will continue to grow and become more representative of how users respond to the survey questions for each criteria, based on the user characteristics of a user.

The process 200 may then continue to block 216, where the system creates a predictive fit model for each criteria response distribution. The pattern analyzer may be used to create fit models for each criteria response distribution compiled in the relational database, as discussed in block 214. In some embodiments, the pattern analyzer creates a fit model for the criteria response relative to every single possible set of user characteristics represented in the relational database. For example, the pattern analyzer will identify a first criteria response distribution for a user with a first age range, a first geographical area, a first user group, and the like, and compile a first fit model of the resulting criteria response distribution. The pattern may then identify a first criteria response distribution for a user with a second age range, a first geographical area, a first user group, and the like, and compile a second fit model of the resulting criteria response distribution.

In some embodiments, the pattern analyzer accesses the data from the relational database through a data stream. In some embodiments, the pattern analyzer simply applies a linear fit to each criteria response distribution to create the fit model. In other embodiments, the pattern analyzer uses multivariate exploratory techniques to identify patterns in the relational datasets to determine a best fit for the criteria response distribution fit model. As such, the pattern analyzer may check the accuracy of multiple fit models on the criteria distribution data for each set of user criteria. In some embodiments, the system checks the accuracy of the following non-exhaustive list of multivariate models: linear regression, nonlinear regression, cluster analysis, factor analysis, discriminant function analysis, multidimensional scaling, log-linear analysis, canonical correlation, stepwise linear and nonlinear regression, correspondence analysis, and classification trees. Upon determining which of the fit model types best-correlates with a criteria response distribution for a first user characteristic distribution, the pattern analyzer may store the best fit model as the fit model for the criteria distribution relative to the first user characteristic distribution. The pattern analyzer may then similarly determine the best fit models for the criteria distribution relative to the remaining user characteristic distributions, storing the resulting best fits as the best fits for their respective user characteristic distributions. These fit models provide the expected distribution of criteria responses from users with specific user characteristics, and can be used to predict how a similarly characterized user would respond to a future question regarding the same criteria for the same or a different feature.

As more surveys are conducted, the criteria response distributions for each set of user characteristics grow and become more representative of how users tend to respond to surveys, based on the user characteristics of each user. With each new set of survey data, the predictive fit models need to be updated to better match the new, more representative criteria response distributions. As such, the system learns from each survey conducted, creating better predictive fit models with each survey and better preparing the system to ultimately predicting new or hypothetical user responses based on the user characteristics of each new or hypothetical user. Therefore, in some embodiments, the system periodically or continuously updates the predictive fit models for each criteria distribution. In some embodiments, the system only updates the predictive fit models upon determining that a change in the criteria distribution has occurred. Additionally, the system and/or the manager of a feature may decide to change the values given to user weighting and/or user group weighting. Such changes likely would affect the distribution of the user responses as the strength in user response will be altered. Therefore, the system may update the predictive fit models for each affected criteria distribution upon a determination that at least one weighting value associated with a feature has been changed.

Finally, the process 200 moves to block 218, where the system repeats blocks 202 through 216 until at least one criteria response distribution fit model passes an accuracy test. Just because the system has identified a predictive fit model for a criteria distribution does not necessarily mean that the predictive fit model is accurate enough to effectively represent future or hypothetical users with the same or similar user characteristics. The system may therefore check the accuracy of the fit models, to ensure that the accuracy meets a certain accuracy threshold. The accuracy threshold may be provided by a manager of the system or other individual or group associated with the entity with knowledge of fit model accuracy. In other embodiments, the system or a manager may determine or alter the accuracy threshold based on the importance of the respective criteria to the overall application.

In some embodiments, the system will check the accuracy of the predictive fit model using regression validation, which encompasses analyzing the goodness of the fit, analyzing whether regression residuals or other outliers are random, checking whether the predictive fit model's predictive performance varies significantly upon the introduction of new criteria response distribution data, and checking whether the predictive fit model is over fitting the criteria response distribution data.

The accuracy threshold may be based on how strong the goodness of fit is or, alternatively, how small the determined fit error is. In some embodiments, the accuracy threshold is constant for all predictive fit models. In other embodiments, the accuracy threshold varies based on which predictive fit model is being tested. These variances may be assigned by an application manager or by the system upon a determination that the predictive fit model is associated with a criteria that is more or less important than other criteria associated with a feature.

The system may determine an accuracy value for each of the predictive fit models, and compare this accuracy value to the accuracy threshold for each respective predictive fit model. In some embodiments, the pattern analyzer of the system may identify multiple predictive fit models for a first criteria response distribution associated with a first set of user characteristics that can pass the accuracy threshold test. In such embodiments, the system may choose the best predictive fit model for the first criteria based on which predictive fit model has a higher accuracy. Alternatively, the system may choose the best predictive fit model for the first criteria based on which predictive fit model is the least complex. Alternatively, the system may choose the best predictive fit model for the first criteria based on which predictive fit model is the most complex. Of course, the system may choose or be assigned to user any one of these approaches or a combination of these approaches to determine a best fit model for each criteria response distribution.

The system may store the best predictive fit model for each criteria response distribution, relative to each set of user characteristics, in a database along with indications as to whether or not each of the predictive fit models has passed the accuracy test. The system has therefore created a relatively concise set of predictive fit models for every criteria response distribution surveyed, and the system may easily retrieve either some or all of these predictive fit models for future tasks.

Moving now to FIG. 3, a general process flow 300 is provided for conducting predictive analysis of a hypothetical criteria survey before an actual survey is provided to users, thereby reducing the computing resources necessary to process surveys through a collaborative decision engine. Overall, the process 300 described herein allows an entity to receive accurate user expectations of criteria for an application feature in a manner that is much less time, cost, and labor-intensive than providing surveys to every user and compiling the user responses into useable analytical feedback. As described with respect to process 200 in FIG. 2, the systems described herein are capable of building on top of each iteration of user surveys, allowing the overall system to learn, grow, and increase in accuracy and effectiveness over time.

The process 300 allows the entity to conduct criteria-based decision making for a feature using multiple criteria and user characteristic parameters. The system therefore allows the entity to make informed decisions by structuring a complex problem based on predictive fit models that eliminate or reduce the need for computational resource-intensive analysis of a plurality of user surveys that can be a burden on the entity as well as the users queried. Such criteria based decision making allows the entity to identify whether criteria of an application are necessary, liked by the plurality of users, useful, resource-intensive, in need of improvement, and the like.

The process 300 begins with block 302, where the system identifies a plurality of users that use a feature. As in process 200, these users may be any individuals that utilize, operate, manage, or otherwise have some form of interaction with the feature. This interaction may be through a user's employment or other work with the entity, or through a user's dealings with the entity as a customer of the entity. The users may be identified through one or more employee, contractor, customer, or databases that record information about users and their association with the entity. Generally, the identified plurality of users that use the feature is large enough that sending a survey to each user regarding the feature would be time-consuming, expensive, and generally burdensome on the entity. However, the opinions of this plurality of users that use the feature can be beneficial to the entity in how it manages the feature and/or the application associated with the feature overall.

The process 300 then continues to block 304, where the system retrieves user characteristics for each of the plurality of users. Again, as with process 200, the system may retrieve such user characteristics from the one or more databases associated with the user.

Next, the process 300 moves to block 306, where the system identifies criteria associated with the feature. In some embodiments, the criteria associated with the feature may be identified by the system based on the type of feature being analyzed. In some embodiments, the criteria associated with the feature may be predetermined criteria previously or concurrently received from a manager of the feature and/or the application. In some embodiments, the system may prompt a manager of the feature and/or application to select the criteria to be analyzed for the current feature. In such embodiments, the manager's input constitutes the identified criteria. In some embodiments, the identified criteria are at least some of the criteria used in the surveys described in FIG. 2. In some embodiments, one or more of the identified criteria were not used in the surveys described in FIG. 2.

The process 300 then proceeds to block 308, where the system determines predictive responses for each criteria of the feature based on stored prediction fit models for each criteria and set of user characteristics. As described above regarding the process 200 in FIG. 2, the system already has prediction fit models of the likely criteria response distribution for each set of user characteristics. The system may therefore associate each of the identified criteria for the feature with their respective plurality of fit models for that same criteria, relative to each distinctive sets of user characteristics. For example, once the system has identified a first criteria as being associated with the feature, the system may then retrieve the plurality of prediction fit models for that first criteria. The system may then identify each set of user characteristics for each of the plurality of users and apply the appropriate prediction fit model to each user. In some embodiments, the system associates a user with a predictive fit model if there is a predictive fit model stored.

The system may then determine a predictive response for each of the plurality of users based on each user's respective predictive fit model. These predictive fit models already encompass the user weighting and user group weighting factors that would normally be requested in a survey, so the predictive response is normally a single criteria expectation fully weighted and ready to be aggregated with the other user responses.

In other embodiments, the system only associates a user with a predictive fit model if the predictive fit model associated with the criteria and the set of user characteristics of the user has passed the accuracy test described in block 218 of FIG. 2. In some embodiments, the system has already stored a predictive fit model for each criteria and set of user characteristics being analyzed for the feature. In other embodiments, the system does not already have a predictive fit model associated with a criteria and/or a respective set of user characteristics. In such an embodiment, the system may not assign a predictive fit model to the criteria for the set of user characteristics, and the system may remedy the lack of a predictive fit model in block 314. In other embodiments, the system may determine that the criteria and/or the set of user characteristics are similar to stored criteria and/or user characteristics, and the system will therefore assign a similar predictive fit model to the criteria and set of user characteristics without a stored fit model.

Next, the process 300 proceeds to block 310, where the system determines probabilities of distinctness for each predictive response based on the predictive responses, the stored fit models for each criteria, and the sets of user characteristics. The system analyzes the predictive fit models for each criteria and set of user characteristics pairing of the current plurality of users to determine whether each user would likely provide a distinct criteria response. Assuming, for example purposes, that there are three possible selectable criteria expectations for a first criteria, the system will analyze the predictive fit models of that criteria for each set of user characteristics present in the current plurality of users to determine whether each user would select the first criteria expectation, the second criteria expectation, the third criteria expectation, be split between any two criteria expectations, or be split between all three criteria expectations. The determined selection may be referred to as the predictive response of the user.

The process 300 then moves to block 312, where the system determines each user's predictive response. In some embodiments, the system gives full value to the expected response of each user. In other embodiments, the system gives a weighted value to the expected response of each user based on the likelihood that the user would select each response. For example, if a user with a first set of user characteristics is 20% likely to select a first criteria expectation, 30% likely to select a second criteria expectation, and 50% likely to select a third criteria expectation, based on the predictive fit model, then the system may assign 20% of the value normally given to that user for the user's input for the first criteria expectation, 30% of the normal value given for the second criteria expectation, and 50% for the third criteria expectation. In other embodiments, the system may simply assign the full value of the user's response to the third criteria expectation since it is the most likely criteria expectation to be selected. In either embodiment, the system may store these predictive responses and consider the predictive responses the expected responses of the plurality of users without ever having to send surveys to the plurality of users requesting feedback on the feature.

Next, the process 300 continues to block 314, where the system provides a survey to a set of users comprising at least one question related to a criteria of at least one predictive fit model that does not meet a threshold probability of accuracy. As discussed above, in some embodiments, the system either does not already have a predictive fit model for a criteria and/or a set of user characteristics, or the predictive fit model is not accurate enough to serve as a good representation of how a user may respond to a survey about a criteria of the feature based on the user's characteristics. In such embodiments, the system may determine which criteria of the feature are not fully represented by predictive fit models, and/or which users have sets of user characteristics that are not represented by the stored predictive fit models. The system may then send targeted surveys to a second plurality of users, wherein the second plurality of users are a subset of the original plurality of users, and wherein the second plurality of users are the users whom the system requires criteria responses from to make up for the lack in predictive fit models. Therefore, the system is sending surveys to users that only contain questions related to the criteria that cannot currently be effectively represented by the current predictive fit models. In some embodiments, the act of sending out the surveys may encompass only sending the survey to a few individuals and/or only providing one or a few survey questions. This smaller set of less-complex surveys saves time and cost, and increases the overall efficiency for the entity associated with the system, as the predictive fit models replace the rest of the surveys and/or survey questions. In some embodiments, this step is conducted substantially in the same manner as block 204 of FIG. 2.

In some embodiments, the system determines that the user group weighting of at least one of the users that would be surveyed in block 314 is below a predetermined user weighting threshold. In such embodiments, the system may consider that the user's response to the survey as insignificant in the system's analysis of the queried criteria. The system may therefore refrain from sending a survey to the at least one users. For example, if the system uses a percentage weighting method, and a particular user group's weighting for a first criteria is below 10%, then the system may not send users in that user group a survey with questions related to the first criteria because the system will not take those criteria responses into substantial consideration. The system would therefore be further limiting the number of surveys that the system would need to send out to users of the feature, thereby further reducing the workload on the system and the entity overall. The resources required to conduct a survey of multiple users can be significant to an entity because asking the users to fill out responses for each criteria takes time, keeps the users from conducting their normal business, and it can be difficult to get 100% of the users to actually respond to such a survey. Therefore, any reduction to the number of surveys sent out and any reduction to the amount of content that the users must fill out in a survey will ultimately reduce the burden on the entity to conduct criteria-based decision making for a feature of an application.

The process 300 then proceeds to block 316, where the system receives actual user responses to the survey. In some embodiments, this step is completed in substantially the same manner as block 206 of FIG. 2. As these responses come from at least some of the actual plurality users associated with the feature at hand, the responses may be considered actual responses. In some embodiments, the system adds the actual user responses to the relational database 130 such that the system in process 200 can update its fit models for the criteria distribution fit models that did not meet the threshold probability of accuracy in process 300. As such, the system continues to learn and likely will be more accurate in future iterations of the process 300.

Finally the process 300 moves to block 318, where the decision engine application of the system aggregates the predictive responses with the actual user responses, creating a complete set of user responses. As the system now has either predictive or actual user responses (total responses) for each criteria of the feature, the system may analyze the total responses for each criteria to determine an overall user expectation or opinion of each criteria. The overall user expectations for each criteria may then be presented to an application manager or other individual or group associated with the entity to convey the perceptions of the plurality of users, relative to each criteria of the feature, and therefore the feature as a whole.

In some embodiments, the manager of the application may determine that further criteria should be considered in light of the total responses, and therefore will either add criteria to the process 300 or send out a new set of surveys to the plurality of users that is specially tailored to address any remaining narrow criteria issues.

Referring now to FIG. 4, general process flow 400 is provided for reducing computing resources associated with collaborative decision-making using a self-learning predictive fit model system. This process flow 400 is a brief explanation of one embodiment of how the systems embodied in FIGS. 1-3 work together to generate predictive criteria responses for an application and thereby reduce the time, cost, and computational resources of an entity associated with the systems. Other embodiments are envisioned and described herein, and this embodiment is purely a single example of how the systems may operate. The process 400 begins at block 402 where the system identifies users and user characteristics associated with multiple features of applications. As described above, the system may be studying several applications, each with at least one feature, and each feature having a plurality of users that encounter the feature enough to provide useful feedback regarding criteria of the feature.

Once the system has identified the users and the user criteria for a feature, the process moves to blocks 404, where the system conducts feature surveys. For example, the first feature identified by the system can be the basis of Feature Survey 1 in blocks 404, and the Feature Survey 1 comprises questions related to criteria of the first feature with criteria expectations that the users may input as criteria responses. The next identified feature may can be the basis of Feature Survey 2, and so on. Any number of surveys may be conducted by the system in blocks 404, and some surveys may be repeated over time to ensure that the criteria responses are up to date.

Moving now to block 406, the system may aggregate the criteria responses from the surveys in block 404 with the respective set of user characteristics associated with each criteria response. The criteria responses and their respective user characteristics may be stored in a relational database such that the data may easily be configured and analyzed in subsequent steps.

At block 408, the system determines criteria distributions for each set of user characteristics. As described above, the system will analyze the data in the relational database to determine which sets of user characteristics are the same, or substantially the same, and compile the criteria responses associated with those sets of user characteristics into the criteria distributions. Therefore, each criteria from the surveys in blocks 404 will have a plurality of criteria distributions: one for each set of user characteristics that gave a response to the questions regarding the criteria in a survey. As more surveys from blocks 404 are completed, the criteria distributions will become more robust and will better represent the tendencies of criteria responses for users with each criteria distribution's set of user characteristics.

The process 400 then moves to block 410, where the system determines a predictive fit model for each criteria distribution. These predictive fit models are determined by analyzing the criteria distributions for each set of user characteristics, and may be in the form of any representative regression fit model. This predictive fit model may then be stored for future use in the process 400. Of course, as more feature surveys from blocks 404 are conducted, the criteria distributions, and therefore the predictive fit models, may be altered as the relational data associated with the fit models is enriched. Therefore, the system may run blocks 406 through 410 after every feature survey that is conducted in blocks 404.

At this point, the process 400 may shift to conducting analysis of a single identified feature. This stage begins with block 412, where the system identifies the new feature of an application that should be tested. As described before, an application manager may provide the feature to be tested, or the system may have a list of predetermined features that need to be tested and therefore may select one of the predetermined features from the list. Once this new feature is selected, the process 400 may move to block 414 where the system can identify the criteria of the new feature as well as the users that interact in some way with this feature. At this stage, the system may also identify or retrieve the user characteristics for each of the users that interact in some way with the new feature, where each user may be associated with its own set of user characteristics.

Once the criteria and the associated sets user characteristics are determined for the new feature, the system may proceed to block 416 where, instead of sending feature surveys to the users, the system may apply the stored predictive fit models to the respective sets of user characteristics for each criteria. In this manner, the system has associated the normal distribution of user criteria responses to each user, based on the makeup of each user's characteristics.

The process 400 may then move to block 418, where the system may predict the responses for each user for each criteria. This predictive determination may be based on the predictive fit model and the actual user characteristic makeup of each user. However, in some circumstances, the predictive fit model and the actual user characteristics either do not match up in a useful way or the predictive fit model is not accurate enough to actually represent the expected responses of a user. The system takes this concern into account by providing block 420, where the system determines a confidence score for each predictive fit model. The confidence score can be based on how good the predictive fit model is, taking into account the expected error as well as accounting for over fitting and other potential issues with regression analysis.

Once a confidence score is established for each predictive fit model, the system may determine whether each predictive fit model passes a confidence score threshold value at decision block 422. This threshold value may be determined by the system or by a manager of the application associated with the feature. If a predictive fit model does pass the threshold in decision block 422, then the system progresses to block 424, where the passing predictive fit model is held for aggregation with other responses.

However, if the predictive fit model does not pass the threshold confidence score, then the process 400 moves to block 426 where the system conducts a new specialized feature survey for the criteria associated with the predictive fit model that does not pass the confidence score threshold. The specialized feature survey is unique because it will only provide questions about criteria for which the system cannot otherwise automatically determine a predictive user criteria response. Additionally, in some circumstances, the only need to send the specialized feature surveys to a smaller number of users than the total number associated with the application feature currently being tested. The specialized nature of this featured survey further reduces the resources required to carry out a feature decision-making project. Additionally, once the users respond to the specialized feature survey from block 426, the system may then add the criteria responses, along with the respective sets of user characteristics, to the aggregated data of block 406. This recursive step allows the system to build off of itself, making the overall system a self-learning and growing system that continues to increase in breadth and accuracy with every iteration.

The system may also receive the actual user responses at block 428 to the specialized feature surveys of block 426 so that the system may continue to provide a comprehensive analysis of the new feature being tested. As described above, the actual user responses may comprise the user's input regarding each criteria's expectations, and user weighting. The system may also add any applicable user group weighting to the responses.

Furthermore, the system may proceed to block 424, where it aggregates the predictive responses (with predictive fit parameters that passed the confidence threshold) with the actual user responses from block 428 to compile a total response to the feature based on the user's expectations (and predicted expectations) of the feature's criteria. Finally, in some embodiments, the process 400 may move to block 430 and display the final results of the total response to an application manager or other individual or group associated with the entity. In some embodiments, the application manager may be able to identify specific issues with criteria of the feature, determine a feature's effectiveness and usefulness, and identify any areas in which the application manager would like more information regarding the users' perceptions of the criteria of the feature.

FIGS. 5 & 6 provide sample user interface displays for the survey applications referenced herein. These sample user interface displays are merely examples of one embodiment of the invention and are not meant to be representative of an exclusive survey method or display. Referring to FIG. 5, a sample user interface display 500 is provided to represent one embodiment of how the system may initially display a survey to each user associated with a feature of an application being analyzed. The display 500 includes a criteria table 502 and an inputs table 504. The criteria table 502 comprises a first column 506 that lists criteria types, and a second column 508 that lists the criteria of the feature. In some embodiments, the criteria types are general organizational characteristics of criteria of the feature, such as technological criteria, feature support criteria, and the like. Additionally, the criteria may be specific criteria associated with the criteria type, such as a first technological criteria, a second technological criteria, and the like. In some embodiments, the criteria in the second column 508 are actually sub-criteria of the criteria types listed in the first column 506. For example, if criteria type 1 is Speed, then the first criteria may be speed during a first time period of a day, and the second criteria may be speed during a second time period of the day. The criteria table 502 may also comprise a third column 510 that lists descriptions of the criteria for the users. These criteria descriptions may define the criteria, give instructions to the user about how to respond to the criteria by selecting criteria expectations, and generally aid the user in the decision-making process of filling out the survey.

The inputs table 504 in the display 500 includes three selectable criteria expectations 512 for each criteria listed in the second column 508 of the criteria table 502. As previously described, these criteria expectations 512 are the available criteria responses that the user may input into the system. The criteria expectations 512 may be tailored to each criteria being analyzed, such that the criteria expectations for a first criteria may be different than the available criteria expectations for a second criteria. The criteria expectations 512 may be selectable through the user interface via a touchscreen, a keyboard entry mechanism, or other input mechanism. While three criteria expectations are illustrated in this example, any number of criteria expectations could be used in the surveys, and the number of criteria expectations could vary between criteria in the same survey. The input table 504 shown in the display 500 also includes input values 514 for each criteria expectation. The input values 514 are the quantitative value assigned to each selectable criteria expectations 512, and this value can be used and potentially weighted by the system in later analysis of the user selections. In some embodiments, the users may manipulate the input values, thereby providing a user weighting of the criteria expectation responses. For example, the first criteria expectations may all have a value that is higher than the second and third criteria expectations for each criteria.

FIG. 6 provides a sample display 600 of a user selection review, in accordance with one embodiment of the invention. The display 600 includes a criteria table 602, an inputs column 604, and a criteria response value column 606. The criteria table 602 lists out each criteria type 608 and criteria 610 being analyzed for the feature being tested. The inputs column 604 lists the criteria expectations selected by a user from the display 500 in FIG. 5. The criteria response value column 606 displays the quantitative value associated with the selected criteria expectation for each criteria. This display 600 allows the user to review the criteria expectations selected for each criteria and confirm a submission with a selectable submission button 612. This information may then be received by the system and compiled in a relational database along with the user characteristics of the user that filled out the survey, thereby associating that user's responses and user characteristics with every other criteria response and respective user characteristics that the system has already gathered. In some embodiments, the system may manipulate the quantitative input value for one or more criteria based on the user group that the user is associated with before compiling the user's responses in the relational database.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for reducing computing resources associated with collaborative decision-making, said system comprising:
   one or more memory devices having computer readable program code stored thereon; and
   one or more processing devices operatively coupled to the one or more memory devices, wherein the one or more processing devices are configured to execute the computer readable program code to:
      identify a plurality of users that use a feature of an application, wherein the application is a virtual or physical process or task associated with an entity, and wherein the feature is at least a component of the application;
      retrieve, from a database, sets of user characteristics for each of the plurality of users;
      identify criteria associated with the feature, wherein the criteria are aspects of the feature that affect how the plurality of users perceives the feature or makes a decision regarding the feature;
      determine predictive responses for each criteria of the feature based on stored prediction fit models for each criteria and each set of user characteristics represented in the identified plurality of users, wherein the stored predictive fit models provide a predictive analysis of how a future user would respond to a criteria question based on a user characteristic, and wherein the stored predictive fit models are determined by analyzing historical information comprising:
         historical feature surveys previously provided to previous users for the feature, wherein the historical feature surveys included a request for previous user input for each criteria of the feature and a previous user weightings of each criteria of the feature;
         received previous user input for each criteria of the feature and the previous user weightings of each criteria of the feature;
         determined previous user group weightings for each previous user input for each criteria based on a user group associated with each previous user; and
         determined criteria response distributions for characteristics of each previous user based on the previous user input, the previous user weightings of each criteria of the feature; and the determined previous user group weightings;
      determine confidence scores for each predictive response associated with a probability of accuracy of each predictive response based on the predictive response, the stored fit models for each criteria, and the sets of user characteristics;
      determine that a first predictive response from the predictive responses for each criteria does not meet a threshold confidence score;
      in response to determining that the first predictive response does not meet the threshold confidence score, transmit a new survey to computing devices associated with the plurality of users comprising at least one question related to the predictive response that does not meet the threshold confidence score;
      receive, from the computing devices associated with the plurality of users, an actual response as user input associated with the new survey from the plurality of users;
      replace the first predictive response with the actual response; and
      display the actual response, along with predictive responses that do meet respective determined threshold confidence scores, on a computing device user interface associated with a manager of the application.

2. The system of claim 1, wherein the sets of user characteristics are characteristics of each responding user and include at least one of user group, geographical location, time zone, work experience, and technical background.

3. The system of claim 1, wherein the criteria associated with the feature include at least one of ease of use, intuitiveness, speed, maintainability, effectiveness, amount of support required, usefulness, whether the feature should be retained, and an extent to which a responding user utilizes the feature.

4. The system of claim 1, wherein determining the confidence score further comprises:
   determining a goodness of fit for the predictive fit model based on a correlation between the predictive fit model and its respective criteria distribution; and calculating a confidence score based on the goodness of fit.

5. The system of claim 1, wherein the criteria response distributions for characteristics of each previous user is analyzed by a pattern analyzer that determines a linear or nonlinear regression fit model for the criteria response distribution.

6. A computer program product for reducing computing resources associated with collaborative decision-making, the computer program product comprising a non-transitory computer readable medium comprising computer readable instructions, the instructions comprising instructions for:
  identifying a plurality of users that use a feature of an application, wherein the application is a virtual or physical process or task associated with an entity, and wherein the feature is at least a component of the application;
  retrieving, from a database, sets of user characteristics for each of the plurality of users;
  identifying criteria associated with the feature, wherein the criteria are aspects of the feature that affect how the plurality of users perceives the feature or makes a decision regarding the feature;
  determining predictive responses for each criteria of the feature based on stored prediction fit models for each criteria and each set of user characteristics represented in the identified plurality of users, wherein the stored predictive fit models provide a predictive analysis of how a future user would respond to a criteria question based on a user characteristic, and wherein the stored predictive fit models are determined by analyzing historical information comprising:
    historical feature surveys previously provided to previous users for the feature, wherein the historical feature surveys included a request for previous user input for each criteria of the feature and a previous user weightings of each criteria of the feature;
    received previous user input for each criteria of the feature and the previous user weightings of each criteria of the feature;
    determined previous user group weightings for each previous user input for each criteria based on a user group associated with each previous user; and
    determined criteria response distributions for characteristics of each previous user based on the previous user input, the previous user weightings of each criteria of the feature; and the determined previous user group weightings;
  determining confidence scores for each predictive response associated with a probability of accuracy of each predictive response based on the predictive response, the stored fit models for each criteria, and the sets of user characteristics;
  determining that a first predictive response from the predictive responses for each criteria does not meet a threshold confidence score;
  in response to determining that the first predictive response does not meet the threshold confidence score, transmitting a new survey to computing devices associated with the plurality of users comprising at least one question related to the predictive response that does not meet the threshold confidence score;
  receiving, from the computing devices associated with the plurality of users, an actual response as user input associated with the new survey from the plurality of users;
  replacing the first predictive response with the actual response; and
  displaying the actual response, along with predictive responses that do meet respective determined threshold confidence scores, on a computing device user interface associated with a manager of the application.

7. The computer program product of claim 6, wherein the sets of user characteristics are characteristics of each responding user and include at least one of user group, geographical location, time zone, work experience, and technical background.

8. The computer program product of claim 6, wherein the criteria associated with the feature include at least one of ease of use, intuitiveness, speed, maintainability, effectiveness, amount of support required, usefulness, whether the feature should be retained, and an extent to which a responding user utilizes the feature.

9. The computer program product of claim 6, wherein determining the confidence score further comprises:
  determining a goodness of fit for the predictive fit model based on a correlation between the predictive fit model and its respective criteria distribution; and
  calculating a confidence score based on the goodness of fit.

10. The computer program product of claim 6, wherein the criteria response distributions for characteristics of each user is analyzed by a pattern analyzer that determines a linear or nonlinear regression fit model for the criteria response distribution.

11. A computer implemented method for reducing computing resources associated with collaborative decision-making, said computer implemented method comprising:
  identifying, via a processing device, a plurality of users that use a feature of an application, wherein the application is a virtual or physical process or task associated with an entity, and wherein the feature is at least a component of an application;
  retrieving, via a processing device, from a database, sets of user characteristics for each of the plurality of users;
  identifying, via a processing device, criteria associated with the feature, wherein the criteria are aspects of the feature that affect how the plurality of users perceives the feature or makes a decision regarding the feature;
  determining, via a processing device, predictive responses for each criteria of the feature based on stored prediction fit models for each criteria and each set of user characteristics represented in the identified plurality of users, wherein the stored predictive fit models provide a predictive analysis of how a future user would respond to a criteria question based on a user characteristic, and wherein the stored predictive fit models are determined by analyzing historical information comprising:
    historical feature surveys previously provided to previous users for the feature, wherein the historical feature surveys included a request for previous user input for each criteria of the feature and a previous user weightings of each criteria of the feature;
    received previous user input for each criteria of the feature and the previous user weightings of each criteria of the feature;
    determined previous user group weightings for each previous user input for each criteria based on a user group associated with each previous user; and
    determined criteria response distributions for characteristics of each previous user based on the previous user input, the previous user weightings of each criteria of the feature; and the determined previous user group weightings;

determining, via a processing device, confidence scores for each predictive response associated with a probability of accuracy for each predictive response based on the predictive response, the stored fit models for each criteria, and the sets of user characteristics;

determining, via a processing device, that a first predictive response from the predictive responses for each criteria does not meet a threshold confidence score;

in response to determining that the first predictive response does not meet the threshold confidence score, transmitting, via a processing device, a new survey to the plurality of users comprising at least one question related to the predictive response that does not meet the threshold confidence score;

receiving, via a processing device, from the computing devices associated with the plurality of users, an actual response as user input associated with the new survey from the plurality of users;

replacing, via a processing device, the first predictive response with the actual response; and displaying, via a processing device, the actual response, along with predictive responses that do meet respective determined threshold confidence scores, on a computing device user interface associated with a manager of the application.

12. The computer implemented method of claim 11, wherein the sets of user characteristics are characteristics of each responding user and include at least one of user group, geographical location, time zone, work experience, and technical background.

13. The computer implemented method of claim 11, wherein the criteria associated with the feature include at least one of ease of use, intuitiveness, speed, maintainability, effectiveness, amount of support required, usefulness, whether the feature should be retained, and an extent to which a responding user utilizes the feature.

14. The computer implemented method of claim 11, wherein determining the confidence score further comprises:
   determining a goodness of fit for the predictive fit model based on a correlation between the predictive fit model and its respective criteria distribution; and
   calculating a confidence score based on the goodness of fit.

15. The computer implemented method of claim 11, wherein the criteria response distributions for characteristics of each previous user is analyzed by a pattern analyzer that determines a linear or nonlinear regression fit model for the criteria response distribution.

* * * * *